No. 643,528. Patented Feb. 13, 1900.
A. C. PALMER.
TIRE REMOVER AND SETTER.
(Application filed Oct. 27, 1899.)
(No Model.)
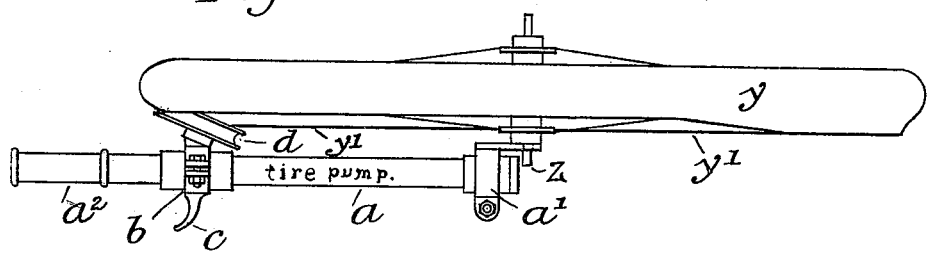
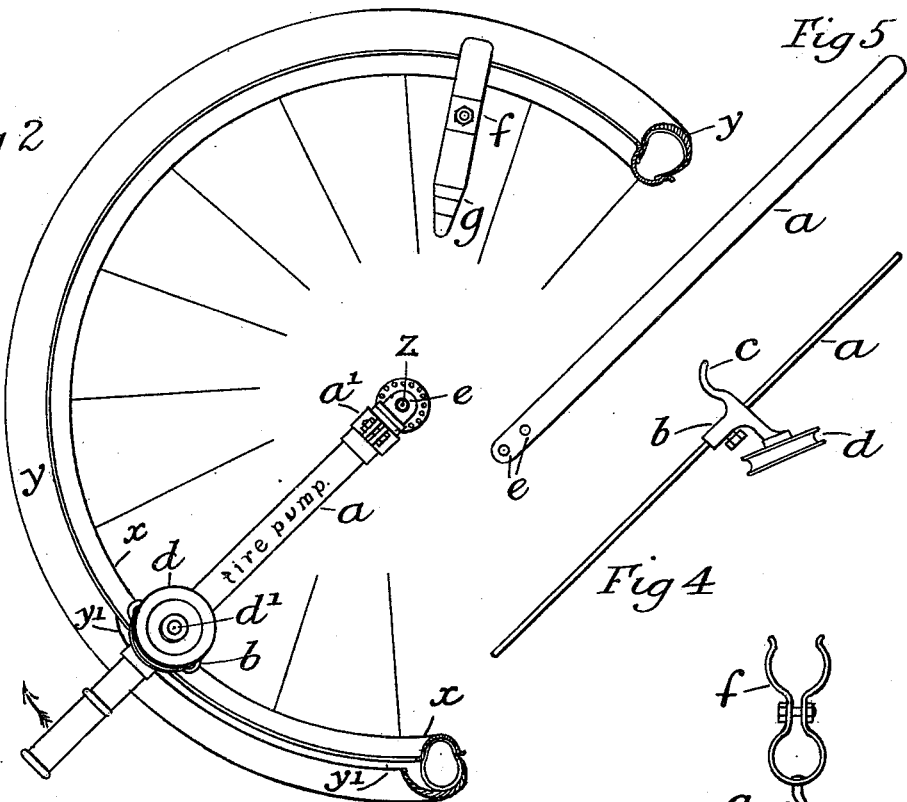
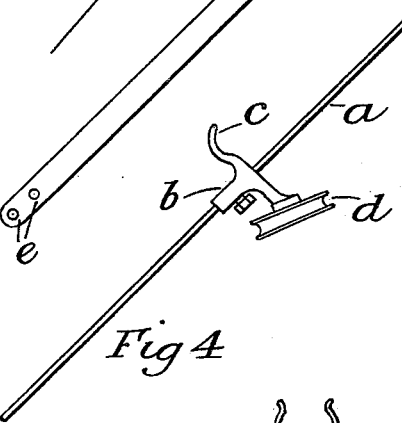
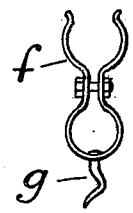
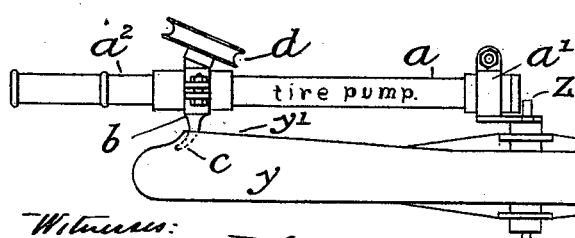

UNITED STATES PATENT OFFICE.

ALBERT C. PALMER, OF EUROA, VICTORIA.

TIRE REMOVER AND SETTER.

SPECIFICATION forming part of Letters Patent No. 643,528, dated February 13, 1900.

Application filed October 27, 1899. Serial No. 734,966. (No model.)

*To all whom it may concern:*

Be it known that I, ALBERT CLAYTON PALMER, a subject of the Queen of the United Kingdom of Great Britain and Ireland, residing at Euroa, in the Colony of Victoria, have invented certain new and useful Improvements in Appliances for the Removal from and Replacing of Pneumatic Tires on Wheel-Rims; and I do hereby declare the following to be a full, clear, and exact description of the invention, such as will enable others skilled in the art to which it appertains to make and use the same.

This invention consists of a novel appliance for manipulating—that is, removing from and replacing on the rim—pneumatic cycle-tires, or rather that external tire which is usually termed the "cover," because it usually incloses a thin inner tube, which, however, is always put on or removed with ease once the tire-cover is disposed of. This disposal has hitherto presented much difficulty and caused damage to the cycle as well as undue loss of time so far as very many cyclists are concerned. The operations of removing and replacing the tire-cover are performed with rapidity and ease by this invention, and injury to the wheel-rim and cover is avoided. By my construction a movable rod is used, which is at or near one (herein called the "lower") end adapted to be attached or pivoted to or on the axle of the wheel the tire-cover of which is to be removed or put on. At the other (herein called the "upper") end of the said rod is a projection, consisting of any suitably bent or hooked plate or arm, which is used for the purpose of removing the cover. On that side of the said rod which is opposite to the said bent plate there is a projection which serves as the axle of a wheel which has circumferentially a flange or a groove and which is used for the purpose of putting the tire-cover upon the cycle-wheel rim. The distance between the said bent plate (and flanged wheel) and the said lower end of the rod is adjustable, and this is preferably accomplished by attaching said bent plate (and wheel) to a sleeve fitting on and movable along the said rod. A clamp is also used to temporarily hold the tire-cover to the rim for the purposes hereinafter described. The appliance may be made of brass or any other strong material, while parts improved by being covered with rubber or with a smooth substance like celluloid may be so covered. The appliance is ordinarily constructed in combination with the barrel of a tire-inflater of the ordinary tubular description, the barrel, if weak, being strengthened—as, for example, by adding a piece of tubing over each end—to carry the parts above described. The combination with an inflater renders the appliance far more useful and desirable than it would otherwise be.

In the accompanying drawings, Figure 1 shows an edge view of a cycle-wheel with my appliance, combined with an ordinary inflater, attached. The act of supporting and guiding the tire-cover into position by means of a grooved wheel, so as to put it on the cycle-wheel rim, is here illustrated. Fig. 2 shows in side view part of the cycle-wheel with my appliance attached; but in this instance it is in the position occupied in the act of removing the tire-cover by means of the bent or curved plate aforesaid. The clamp is not used when removing the said tire-cover, but only when replacing it; but it is shown in this view for convenience of illustration in respect to the description of the said replacing. Fig. 3 shows an edge view of a cycle-wheel with my appliance attached, the position of parts when removing the tire-cover being illustrated. Fig. 4 shows a design, edge view, of my appliance without an inflater, the place of which is in this instance occupied by a bar of metal having a movable sleeve which carries the bent plate and the wheel opposite it, before mentioned. Fig. 5 shows the bar in Fig. 4 in side view. Fig. 6 shows the clamp, which is useful to affix to the rim of the cycle-wheel to hold the tire-cover at one part, so as to prevent its slipping out when being manipulated at another part, as aforesaid. At the back end of this clamp is a lever which is useful for the purpose of lifting clear of the rim part of the tire-cover edge, in the first instance, before proceeding to insert the bent plate aforesaid, although it is quite feasible to dispense with this lever and insert the bent plate to begin with.

In the drawings the spindle of a wheel of a cycle is marked $z$, the rim $x$, and the tire-cover $y$. The arm of my appliance (usually the inflater pump-stem) is marked $a$, and $b$ is an adjustable sleeve thereon, a clamp, set-screw, or any suitable means being used for temporarily fastening this sleeve firmly at whatever part of the arm $a$ is found desirable. Projecting from this sleeve is a suitably bent or hooked plate, (marked $c$,) and opposite to it is a grooved wheel $d$, or it may be a broad wheel with a flange on one side (the outer) only of any section which will hold and guide the tire-cover temporarily during the replacing operation and release it, as herein described.

In order to remove the tire-cover $y$, it is necessary to slip one end of the spindle $z$ into a hole $e$ in the lower end of a rod $a$ (or of an attachment thereto, such as a fixed or adjustable sleeve $a'$, thereon, Figs. 1 to 3) or into one of several such holes when a number of them are provided to suit cycle-wheels of various diameters. The operator also slips the outer edge of the bent plate $c$ under any point of the cover $y$, (at which point it has preferably been already raised.) The operator then makes a revolution of the arm $a$ on its center $z$, as per arrow in Fig. 2, and this action raises and disengages the edge of the tire-cover from the rim of the wheel. In the drawings the edge of the tire-cover where exposed (that is, clear of the rim $x$) is marked $y'$.

In order to replace the tire-cover, the operator first slips the said cover over the rim of the wheel, tucking it in by hand as far as convenient. The appliance is then adjusted in position, with the flange (nearest to the said cover) on the edge of wheel $d$ beneath the edge of the tire-cover $y$, as in Fig. 1, and the clamp $f$ (the lever of which is marked $g$) secured over the rim of the cycle-wheel, as in Fig. 2, to prevent the tire-cover slipping. In order that the wheel $d$ may have the part which goes under the tire-cover projecting inward sufficiently to so guide the tire-cover edge as to release the latter, so that it shall fall within the rim $y$, the said wheel $d$ has its axle $d'$ set obliquely to the rod $a$, as shown. The arm $a$ is then revolved on its center, and the successive points of the tire-cover will be found as they are released by wheel $d$ to fall just above or into their places within the rim $x$. Then as the edge of the tire-cover drops on or inside the rim it may be, if desirable, further depressed or tucked in by hand-pressure by the operator, who can use for the purpose the thumb of the hand with which he is (at the same time) revolving the appliance. A convenient part of the rod $a$ for the hand-grasp is marked $a^2$, it being situated slightly more distant from the eye or eyes $e$ than the attachment $b$. The inner tube of the tire is best partially inflated during the replacing of the tire-cover.

This invention need not make the inflater unwieldy, as the parts added to it might be removable, so as to go into the cyclist's tool-bag. The eye $e$ need not be a close fit on the spindle or the like. Various modifications of other details might be made in this invention without departing from its scope.

What I claim as my invention, and desire to secure by Letters Patent of the United States, is—

1. In an appliance for manipulating pneumatic tires of wheels, the combination with the part $a$ adapted to be attached to the axle of the wheel, of the adjustable sleeve or attachment $b$ having the plate or arm $c$ on one side, and the obliquely-set grooved wheel $d$ on the other side, substantially as and for the purposes set forth.

2. In an appliance for manipulating pneumatic tires of wheels, the combination with (and near one end of) the stem of an inflater, of an attachment or part adapted to be attached or pivoted to or on the axle of the wheel, and (at an adjustable distance therefrom on the said stem) a sleeve or attachment having on one side a projection consisting of any suitably bent or hooked plate, and on the side opposite said projection, a flanged or grooved wheel, all as and for the purposes set forth.

3. The combination with the inflater-stem $a$, of the adjustable sleeve or attachment $b$, having the plate or arm $c$ on one side, and the obliquely-set grooved wheel $d$ on the other side substantially as and for the purposes set forth.

4. The combination with a rod or inflater-stem $a$, of an attachment $a'$ having an eye or eyes $e$ (adapted to fit over the spindle $z$ of a wheel) and a sleeve or attachment $b$, having the plate $c$ at one side and the grooved wheel $d$ at the other, the distance of the sleeve or attachment $b$ from the eye or eyes $e$ being adjustable the said rod or stem having also a part or end $a^2$, (to be grasped by the operator) more distant from the eye or eyes $e$ than the said attachment $b$, so as to enable an external tire or cover to be removed and replaced substantially as set forth.

In testimony whereof I affix my signature in presence of two witnesses.

ALBERT C. PALMER.

Witnesses:
G. G. TURRI,
W. H. CUBLEY.